Oct. 23, 1928.
A. A. DENSMORE
1,688,486
POWER TRANSMISSION APPARATUS
Filed June 10, 1920
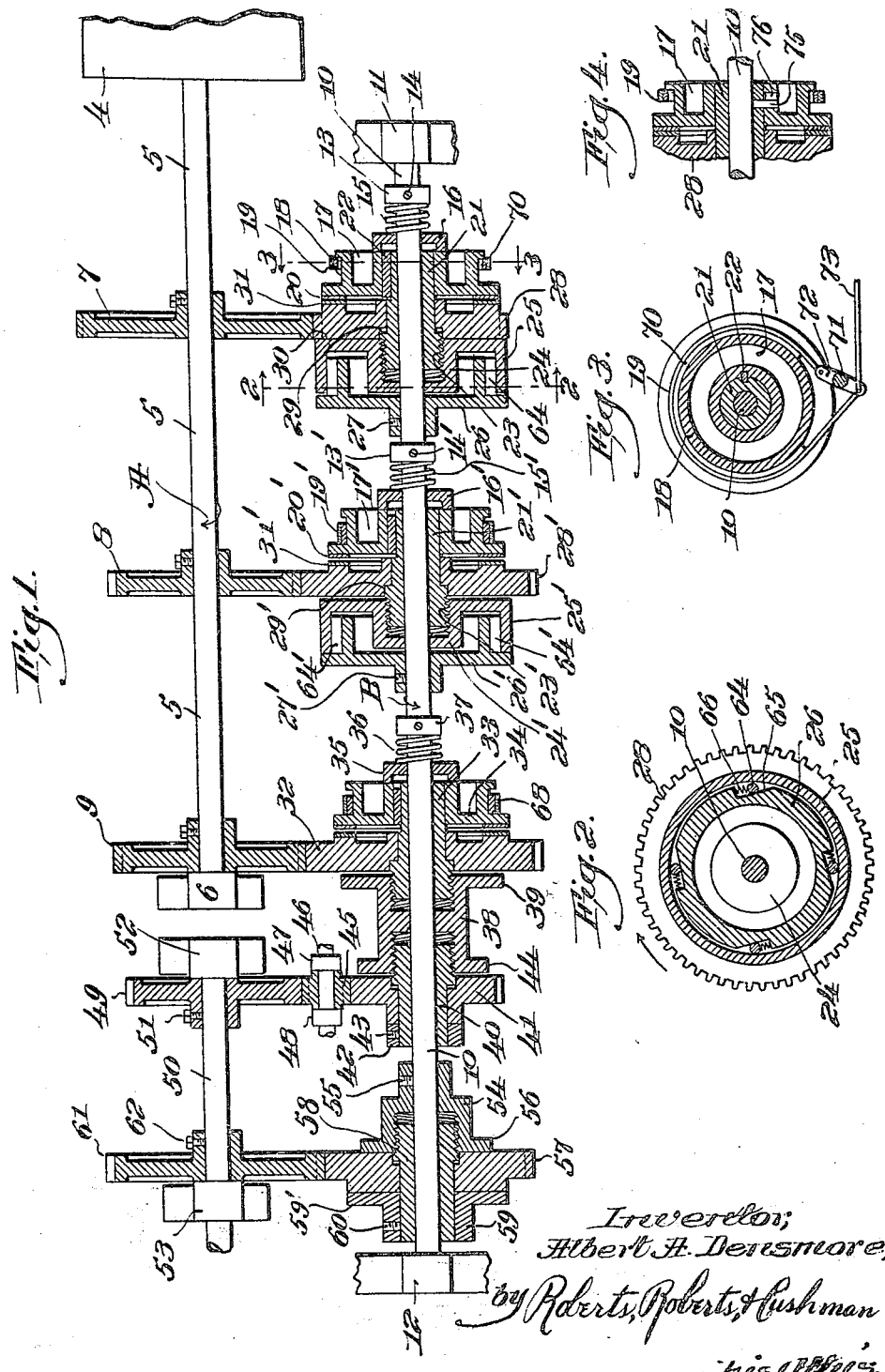

Patented Oct. 23, 1928.

1,688,486

UNITED STATES PATENT OFFICE.

ALBERT A. DENSMORE, OF BOSTON, MASSACHUSETTS, ASSIGNOR TO ECLIPSE MACHINE COMPANY, OF ELMIRA HEIGHTS, NEW YORK, A CORPORATION OF NEW YORK.

POWER-TRANSMISSION APPARATUS.

Application filed June 10, 1920. Serial No. 387,841.

My invention relates to an improved transmission gear for automobiles and more particularly to an improved transmission gear of the individual clutch type, in which type the various changes of gear ratios are affected simultaneously with the engagement of some form of clutch which brings the desired gear ratio into action. Change gears of this type have the important advantage that the gear wheels are constantly in mesh, which fact eliminates the difficulties of gear shifting with spinning gears and avoids danger of injuring gear teeth when shifting from one ratio to another. The noise of engagement present in the usual gear shift is also eliminated.

An important feature of my invention lies in the fact that I provide individual clutches of the friction type for my several gears rather than the positively engaging clutches which have heretofore been used in separate clutch change gear sets. The most important result of my use of individual friction clutches in this connection lies in the fact that I avoid the necessity for the use of a master clutch. The use of a positive clutch in an individual clutch gear shift requires the use of a master clutch of the friction type which can be let in gradually. This follows from the fact that with the use of a positive clutch alone the connection is made so suddenly as to stall the engine or break the gears, and also to jolt the vehicle, all of which renders such a construction impractical.

The use of the individual clutch for gear selection without the interposition of a master clutch has been considered infeasible except with planetary gears and practical difficulties in the construction of such gears limit them to two forward speeds and a reverse. By the use of my improved gear transmission the master clutch is eliminated, with consequent simplification of the vehicle control, and my device may be made with any desired number of gear ratios, each gear ratio being a separate entity and not involving modification of other gears.

It is an object of my invention to provide a new and improved change speed transmission gear of the individual clutch type so constructed as to avoid the necessity for the use of a master clutch. It is an object to provide a change gear which may provide any desired number of speed ratios and be operated by individual clutches for each ratio without the use of a master clutch. It is also an object to provide such a gear set having positive locking friction clutches. It is an additional object to provide a device of this character which is comparatively simple in construction, certain in its operation and relatively inexpensive to manufacture. Other and further objects will appear as the description proceeds.

I have illustrated a preferred embodiment of my invention in a somewhat diagrammatic manner in the accompanying drawing, in which, Figure 1 is a plan view, largely in section, showing my gear assembly;

Figure 2 is a section on line 2—2;

Figure 3 is a section on line 3—3; and

Figure 4 is a broken away section similar to a portion of Figure 1.

As shown in Figure 1, the engine is designated by 4 and the main shaft 5 runs from the engine to the bearing 6. Keyed to main shaft 5 are the high speed gear 7, low speed gear 8 and reverse gear 9.

The counter shaft 10 is held parallel to the main shaft in the bearings 11 and 12. Adjacent to the right end of the counter shaft the collar 13 is keyed to the shaft by the set screw 14. A coil compression spring 15 is interposed between the collar 13 and the axially movable thrust collar 16. To the left of the thrust collar is the brake drum 17 having the brake surface 18 surrounded by the brake band 19 and having on its left face the friction material 20. This brake drum is keyed to the sleeve 21 by the spline 22, the sleeve being free to rotate on the shaft 10. The left end of the sleeve is externally threaded at 23 and interfits with the clutch drum 24 which latter has the outer flange 25 surrounding the drive member 26. The drive member 26 is keyed to the shaft by the set screw 27. Seated on the sleeve 21 intermediate the brake drum and clutch drum is the gear wheel 28 which is in mesh with the wheel 7 on the main shaft. This gear is adapted to turn freely on the sleeve 21. The gear 28 has the shoulder 29 adapted to fit over the threaded portion 23 of the sleeve 21 and so that the face 30 of the gear may contact with the clutch drum 24. The outer portion of the face of the gear 28 adjacent the brake drum 17 is faced with brake lining or similar friction material 31. It will be noted that the gear 28 has a small amount of lateral play between the threaded portion 23 of the sleeve 21 on one side and the spline 22 on the other side.

The drive member 26 carries the jam pins 64 in recesses in its outer surface as shown in Figure 2, said pins being pressed angularly against the clutch drum 25 by the springs 66. Consequently when the gear wheel 28 rotates in the direction of the arrow in Figure 2, the pins 64 will be jammed between the clutch drum and the drive member 26 and the latter will be rotated with the clutch drum. When drive of the gear 28 ceases the drive member may continue to rotate with the shaft without carrying with it the clutch drum since the jam pins 64 will back up against the springs 66.

A section of a portion of the high gear assembly is shown in Figure 4, the section being taken on another diameter than that of Figure 1. The sleeve 21 is provided with the pin 75 fitting in the slot 76 in the brake drum 17. The slotted connection limits relative longitudinal movement between the sleeve and drum and this limit causes the screw threaded connection between the sleeve 21 and clutch drum 24 to clamp the gear 28 positively against the brake drum.

As shown in Figure 3 the brake band 19 carries a brake lining 70 and is operated by a lever 72 pivoted at 71, the opposite ends of the band being connected to opposite ends of the lever. Movement of the brake rod 73 to the right will clamp the brake band against the brake drum and the opposite movement will release it.

In mesh with the gear wheel 8 is the gear 28' similar to gear 28 except for the diameter of the gear wheel. The brake and clutch structure is identical with that described and has been indicated by the same reference characters with the addition of a prime. This assembly is shown with the gear wheel out of driving engagement with either the brake drum or clutch drum, the shoulder 29' contacting with the shoulder on the sleeve 21', the space between friction members 20' and 31' being greatly exaggerated in the drawings for clearness of illustration.

The reverse gear wheel 9 is in mesh with a wheel 32, which is similar to the wheels 28 and 28'. This wheel rides on a sleeve 33 similar to the sleeve 21 and is provided with a brake drum 34, brake band 68, thrust collar 35, spring 36 and collar 37 similar to those associated with the gears 28 and 28'.

The sleeve 33 is threaded into the coupling 38 which rides on the shaft 10, and it has a flange 39 adapted to make frictional contact with the wheel 32. Into the other end of the coupling 38 is screwed the sleeve 40 carrying the gear wheel 41 which is retained on the sleeve by the collar 42, the latter being held in place by the screw 43. The coupling 38 is provided with the flange 44 adapted to contact with the gear wheel 41.

The gear wheel 41 is in mesh with the idler gear 45 which latter is supported on the shaft 46 running in bearings 47 and 48 attached to a suitable portion of the gear casing. The idler gear 45 also meshes with the gear 49 which is keyed to the drive shaft 50 by the set screw 51. The drive shaft 50 runs in suitable bearings 52 and 53. Adjacent the left end of the counter shaft 10 is the sleeve 54 keyed thereto by the set screw 55 and having the flange 56 adapted to frictionally engage the gear wheel 57. The gear wheel 57 rides on the sleeve 58, the right end of which screws into the sleeve 54 and the left end of which carries the collar 59, the latter having the wide bearing flange 59' and being held in place by the set screw 60. The gear wheel 57 meshes with the gear 61 which is retained on the shaft 50 by the set screw 62.

For the purpose of explaining the operation of my device it is assumed that the engine 4 is turning the shaft 5 in the direction indicated by the arrow A, or clockwise as viewed from the engine.

The gear wheel 8 meshing with the wheel 28' will cause it to turn in the direction of the arrow B or counter clockwise and the gears 7 and 9 will cause the gears 28 and 32 also to rotate in that direction.

When the brake band 19' is released the slight friction always obtaining between the surface 20' of the drum 17' and the corresponding surface 31' of the rotating gear 28' suffices to impart a slight turning movement to the brake drum which is transmitted to the sleeve 21' by the spline interposed between such parts. Any turning of the sleeve 21' immediately results in causing its threaded end to screw into the clutch drum 25' (which at this time is stationary) moving such drum axially of the shaft to a very slight amount, but enough firmly to clamp the gear 28' between the right-hand end face of the drum 25' and the friction member 20' of the brake drum. When so clamped the parts, including the brake drum, gear, sleeve and clutch drum, all rotate in unison and the clutch drum by means of driving rolls 64' serves to turn the member 26' and therewith the shaft 10, the parts now occupying the position of the high speed assembly, as shown at the right-hand side of Fig. 1. Referring to the latter assembly the operation of stopping is as follows: The brake band 19 is first tightened, thereby stopping the rotation of drum 17, the sleeve 21 also stopping by reason of the splined connection between these parts. The clutch drum 25 still tends to keep on rotating by reason of its momentum, together with the momentum of shaft 10 and associated parts, such action being also assisted by the frictional contact still existing between the constantly rotating gear 28 and the drum. Such rotation of the drum 25 relative to the stationary sleeve causes the drum to unscrew itself from the sleeve. As the drum can only move a very limited distance to the left, being stopped by engagement with the part 26, any further unscrewing of the drum acts to move sleeve 21 axially to the right. The first stage of the above operation thus frees the end face of clutch drum 25 from operative engagement with the rotating gear 28, while the second stage of such operation causes the brake drum 18 to move slightly away from the rotating gear, thereby releasing the frictional engagement between parts 31 and 20. The gear 28 is thus free to continue its rotation without substantial frictional engagement with either the clutch drum 25 or the brake drum 17, although when the latter is allowed freely to turn it is gradually picked up by the rotating gear. The spring 15, while maintaining the parts in proper position upon the shaft, permits such relative movement as may be necessary for carrying out the several operations as above described.

The sleeve 54 rotates with the shaft and, the sleeve 58 lagging through inertia, the threaded connection between the two is screwed up until the gear wheel 57 is firmly clamped between the flange 56 and the collar 59' and turns with the shaft 10, and being in mesh with the gear 61 the latter turns the drive shaft 50 in the clockwise direction.

All parts being as shown in Figure 1 the transmission is transmitting power on high gear to the drive shaft. The lower speed operates in a manner identical with that just described. With the high gear engaged the clutch drive member 26' of the lower gear rotates with the shaft and the jam pins 64' press back against the springs 66' and no connection is made with the clutch drum 25' which rides freely on the shaft with the remainder of the low gear assembly. The same action takes place in the high gear assembly when the lower gear is in effective or driving mesh. Obviously any number of gears similar to these two may be introduced in order to supply any desired number of gear ratios.

In order to throw the high gear out the brake band 19 is tightened against its seat 18 on the brake drum which prevents the latter from rotating. The gear 28 being in mesh with the gear 7 is forced to continue to rotate and does so, carrying with it for at least a portion of a revolution the clutch drum 24 with which it is in frictional contact.

Considering now the reverse gear assembly, the release of the brake band 68 permits the gear 32 to be clamped between the brake drum 34 and the flange 39 in the manner which has been described in connection with the preceding assemblies. The flange 39 is integral with the sleeve 38 and the turning of that sleeve draws the sleeve 40 in by means of the screw threaded connection between the two and clamps the gear 41 between the flanges 42 and 44, the gear wheels 32 and 41 now rotating together. It should be noted that these gears have no driving connection with the counter shaft 10 and that that shaft is not rotated. The gear 41 is in mesh with the idler gear 45 and rotates that gear in the clockwise direction. The idler in turn rotates the drive shaft 50 through the gear 49 and rotates it in the counter clockwise or reverse direction.

The gear 61 on the drive shaft is still in mesh with the gear 57 and will rotate it in the reverse of its normal direction. This movement of the gear wheel 57 carries with it the sleeve 58 through frictional contact with the flange 59' of the collar 59, and the sleeve 58 unscrewing from the sleeve 54, the wheel is no longer clamped and does not turn the counter shaft. This disconnection avoids friction which would be caused by the parts moving in opposite direction and prevents the drive members 26 and 26' from picking up the drive drums 25 and 25' through the jam pins 64 and 64' due to reverse rotation of the counter shaft.

In going out of reverse the brake band 68 is clamped against the brake drum 34, the gear 32 continues to rotate and take with it the coupling 38 through frictional contact with the flange 39, until the gear is released.

When next one of the forward gears is thrown in, the clockwise rotation of the gear 49 is transmitted through the idler gear to the gear 41. The gear 41 carries with it the sleeve 40 by means of collar 42 sufficiently to release the gear 41 and permit it to rotate freely on the sleeve.

When all brake bands are clamped, all gears rotate freely on the counter shaft, the latter does not turn and no power is transmitted to the drive shaft. Unclamping the brake band of either forward gear puts that gear into the drive and also clamps up the gear 57 and unclamps the gear 41 if the latter had been previously clamped.

Similarly, unclamping the brake band of the reverse gear causes that gear and the gear 41 to be clamped and the gear 57 to be unclamped if it was previously clamped.

Obviously any usual gear shift means may be connected to the several brake rods so as to operate them selectively and they may be operated by pedal, hand lever, or compressed air or electricity as desired. They combine in one device the functions of the usual clutch pedal and gear shift lever and thus simplify the operation of a machine.

The showing of my device in the drawings is understood to be illustrative only and obviously the mechanical features may be varied in specific structures in order to fit the device to gear boxes of various sizes and shapes for particular uses.

From the foregoing description it will be evident that cardinal features of my invention comprise two parts (28 and 10, or 28' and 10, or 32 and 33, or 41 and 40, or 57 and 10) rotatable relatively to each other and means for interconnecting said parts to rotate together, including two elements (which may include one of said parts) (16—21 and 25, or 16'—21' and 25', or 33—35 and 38, or 38 and 40—42, or 54 and 58—59) threaded together to interconnect the aforesaid parts when the elements are threaded relatively to each other, one of the aforesaid parts having frictional engagement with one of said elements or the other part (16—21 with 28, or 16'—21' with 28', or 33—35 with 32, or 38 with 41, or 58—59 with 57) thereby to be rotated relatively to the other part by the frictional engagement. The two elements threaded together as aforesaid preferably comprise a collar and a sleeve as for example, collar 25 and sleeve 21.

I claim:

1. A change speed gear for automobiles comprising a plurality of drive gears and an individual clutch for each gear, the clutches being of the type permitting gradual engagement, and means for actuating each clutch by the associated gear.

2. A selective change speed gear for automobiles comprising a plurality of drive gears and an individual friction clutch for each gear, and means for actuating each clutch by the associated gear.

3. A selective change speed gear for automobiles comprising a main shaft having a plurality of gears thereon, a counter shaft carrying gears in mesh with the main shaft gears one of each pair of intermeshing gears being fixed to its shaft and selective means adapted to gradually engage and clamp to its shaft the other of each pair of gears, said means being actuated by the gear which it clamps.

4. A selective change speed gear for automobiles comprising a main shaft having a plurality of gears fixed thereto, a counter shaft carrying gears in mesh with each of the main shaft gears, the counter shaft gears adapted to normally rotate freely about the counter shaft, and selective means adapted to clamp the counter shaft gears frictionally to the counter shaft, said means being actuated by the gear which it clamps.

5. A selective change speed gear for automobiles comprising a main shaft and a drive shaft, gears fixed to each shaft, a counter shaft carrying gears in mesh with the main and drive shaft gears, the counter shaft gears normally being free to rotate about the counter shaft, and means actuated by rotation of the counter shaft in a predetermined direction adapted to clamp to the countershaft one of the countershaft gears.

6. A selective change speed gear for automobiles comprising a main shaft and a drive shaft, gears fixed to each shaft, a counter shaft carrying gears in mesh with the main and drive shaft gears, the counter shaft gears normally being free to rotate about the counter shaft, and means actuated by rotation of the counter shaft in a predetermined direction adapted to clamp to the countershaft one of the gears, in mesh with a gear on the drive shaft.

7. A selective change speed gear for automobiles comprising a main shaft and a drive shaft, gears fixed to each shaft, a counter shaft carrying gears in mesh with the main and drive shaft gears, the counter shaft gears normally being free to rotate about the counter shaft, and means actuated by rotation of the counter shaft in a predetermined direction adapted to clamp to the counter shaft one of the gears in mesh with a gear on the drive shaft, and selective means adapted to clamp other of the counter shaft gears to the counter shaft.

8. A selective change speed gear for automobiles comprising a main shaft and a drive shaft, gears fixed to each shaft, a counter shaft carrying gears certain of which are in mesh with the main and drive shaft gears, and means adapted to secure together one of said counter shaft gears in mesh with a main shaft gear and a second counter shaft gear, said means including a clutch actuated from the main shaft.

9. A selective change speed gear for automobiles comprising a main shaft and a drive shaft, gears fixed to each shaft, a counter shaft carrying gears certain of which are in mesh with the main and drive shaft gears and one of which is in mesh with an idler which is in turn in mesh with a drive shaft gear, and means adapted to secure together one of said counter shaft gears in mesh with a main shaft gear and the counter shaft gear in mesh with the idler gear, said means including a clutch actuated from the main shaft.

10. A selective change speed gear for automobiles comprising a main shaft and a drive shaft, gears fixed to each shaft, a counter shaft carrying gears certain of which are in mesh with the main and drive shaft gears, and friction operated clamp means adapted to secure together one of said counter shaft gears in mesh with a main shaft gear and a second counter shaft gear.

11. A selective change speed gear for automobiles comprising a main shaft having gears fixed thereto and a counter shaft adjacent thereto, sleeves freely moving on the counter shaft, and a gear wheel freely rotating on each sleeve, the gear wheels being in mesh with the main shaft gears and rotating therewith, and means adapted to clamp the gear wheels to the sleeves and to operatively connect the gear wheels and sleeves to the counter shaft whereby the latter will be rotated by rotation of the main shaft, upon one side of the gear wheels.

12. A selective change speed gear for automobiles comprising a main shaft having gears fixed thereto and a counter shaft adjacent thereto, sleeves freely moving on the counter shaft, and a gear wheel freely rotating on each sleeve, the gear wheels being in mesh with the main shaft gears and rotating therewith, a spring pressed brake drum mounted on each of said sleeves to rotate therewith but having longitudinal play adapted to permit it to contact with the gear wheel, a clutch drum screw threaded upon the opposite end of each of said sleeves, and means adapted to operatively connect the clutch drum to the counter shaft, whereby release of the spring pressed brake drum will cause the gear wheel to be clamped between the brake drum and clutch drum and will rotate the countershaft therewith.

13. Power transmission apparatus comprising a driving shaft and a driven shaft, and transmission devices interconnecting said shafts, said devices including a rotating element coaxial with the driven shaft, a part independent of the driven shaft upon which said rotating element is mounted to turn, and a second part having screw threaded engagement with said first part, said threaded parts being constructed and arranged to connect the rotating element with the driven shaft by axial movement rotatively to each other.

14. Power transmission apparatus comprising a rotary driving element, a shaft coaxial therewith, and means for transmitting movement from the driving element to the shaft comprising an externally screw threaded sleeve coaxial with the driven shaft, a member carried by said sleeve and frictionally engageable with said driving element, and a threaded part engaging said sleeve and having an element frictionally engageable with said driving element.

15. Power transmission apparatus comprising a shaft, a sleeve rotatable on said shaft, a collar surrounding said shaft and having a threaded connection with said sleeve, means for restraining said collar from rotating with said shaft, and means for causing said collar to rotate relatively to said sleeve when the collar is released from said restraining means to rotate with said shaft, thereby to cause said collar and sleeve to travel axially relatively to each other by virtue of said threaded connection.

16. A power transmission mechanism comprising a pair of axially aligned, rotatable members having interengaging screw threaded portions, one of said members being axially movable relatively to the other, a radial flange adjacent to the threaded portion of the latter member, a gear rotatably supported upon the other member, a collar fast to said latter member for compelling the gear to move simultaneously therewith, and means for initiating rotation of the flanged member whereby to cause the other member to move axially in a direction to clamp the gear between the collar and flange for causing the gear to rotate with the flanged member.

Signed by me at Boston, Massachusetts, this 29th day of May, 1920.

ALBERT A. DENSMORE.